United States Patent [19]
Last

[11] Patent Number: 5,538,112
[45] Date of Patent: Jul. 23, 1996

[54] PARKING AND EMERGANCY BRAKE ACTUATING LEVER FOR DRUM BRAKE ASSEMBLY

[75] Inventor: Larry L. Last, Northville, Mich.

[73] Assignee: Kelsey-Hayes Company, Romulus, Mich.

[21] Appl. No.: 320,291

[22] Filed: Oct. 11, 1994

[51] Int. Cl.$^6$ ..................................................... F16D 65/56
[52] U.S. Cl. ......................... 188/79.54; 403/68; 403/163
[58] Field of Search .......................... 188/79.54, 79.56, 188/79.64, 328, 106 F, 250 F; 430/68, 66, 70, 163

[56] References Cited

U.S. PATENT DOCUMENTS

| | | | |
|---|---|---|---|
| Re. 31,234 | 5/1983 | Jureit et al. | 403/163 |
| 3,139,295 | 6/1964 | Hosea | 403/163 X |
| 3,967,803 | 7/1976 | Kienlen et al. | 403/163 x |
| 4,150,736 | 4/1979 | Marti . | |
| 4,196,795 | 4/1980 | Izumi | 188/79.54 |
| 4,222,467 | 9/1980 | Kluger et al. . | |
| 4,276,966 | 7/1981 | Ayers . | |
| 4,401,195 | 8/1983 | Last . | |
| 4,582,435 | 4/1986 | Davis | 403/163 X |
| 4,903,800 | 2/1990 | Michoux | 188/79.54 |
| 5,000,296 | 3/1991 | Brooks, Sr. . | |
| 5,062,504 | 11/1991 | Yamamoto . | |
| 5,125,484 | 6/1992 | Inoue | 188/79.54 X |
| 5,295,561 | 3/1994 | Le Moigne | 188/79.54 X |

*Primary Examiner*—Robert J. Oberleitner
*Assistant Examiner*—Kevin D. Rutherford
*Attorney, Agent, or Firm*—MacMillan, Sobanski, & Todd

[57] ABSTRACT

An actuating lever for a parking and emergency brake mechanism for use in a vehicle drum brake assembly includes a backing plate mounted on the vehicle for supporting a pair of brake shoes. A service brake mechanism is provided for selectively moving the brake shoes apart from one another into frictional engagement with an inner friction surface of a brake drum mounted on a wheel of the vehicle. The brake shoes include respective web portions which are generally flat and crescent-shaped. Arcuate table portions are secured to the opposed outer curved surfaces of the web portions, such as by welding, and friction pads are secured to the outer arcuate surfaces of the table portions of the brake pads. An aperture is formed through the upper end of the web portion of one of the brake shoes. The actuating lever for the parking and emergency brake mechanism is pivotally supported on the one brake shoe. The actuating lever includes a generally flat and arcuate body portion having a stiffening rib formed along a portion thereof. A hollow cylindrical boss is formed integrally with the upper end of the body portion, extending upwardly from one side thereof. The upstanding integral boss of the actuating lever extends through the aperture formed through the upper web portion of the brake shoe. As a result, the actuating lever is retained on the brake shoe for pivoting movement relative thereto about the boss without any undesirable looseness or play therebetween, and without the use of additional parts or significant installation time.

21 Claims, 3 Drawing Sheets

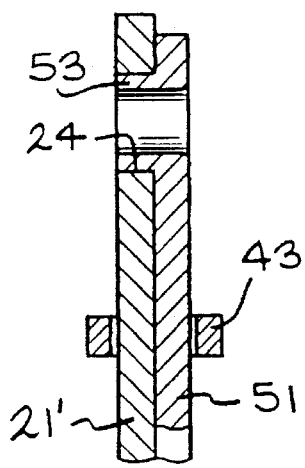
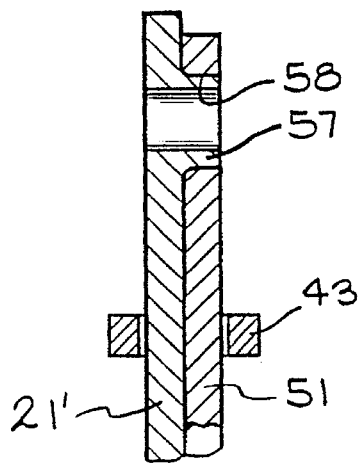
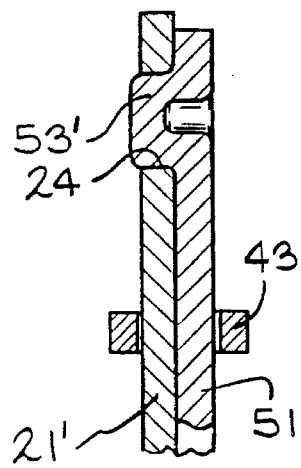
FIG. 4  FIG. 5  FIG. 6
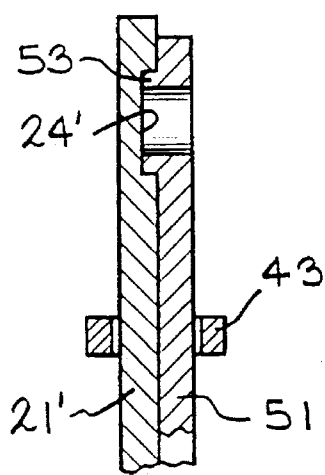
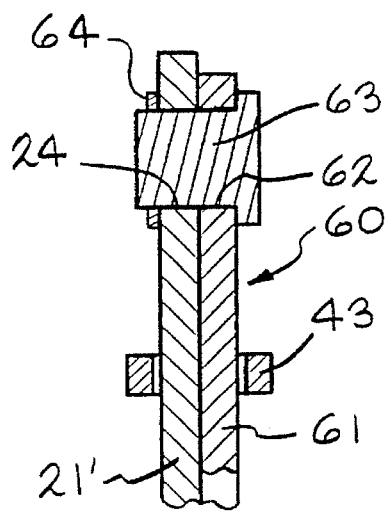
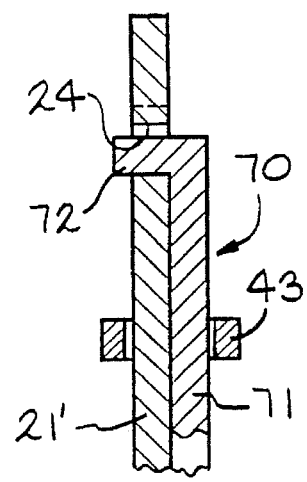
FIG. 7  FIG. 8  FIG. 9
       PRIOR ART  PRIOR ART

PARKING AND EMERGANCY BRAKE ACTUATING LEVER FOR DRUM BRAKE ASSEMBLY

BACKGROUND OF THE INVENTION

This invention relates in general to vehicle drum brake assemblies and in particular to an improved structure for a parking and emergency brake actuating lever adapted for use in such a vehicle drum brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. The brake drum assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the hollow cylindrical interior thereof. To effect braking action, the brake shoes are moved outwardly apart from one another so as to frictionally engage the inner cylindrical braking surface of the brake drum. Such frictional engagement causes retarding or stopping of the rotational movement of the brake drum and, therefore, the wheel of the vehicle in a controlled manner.

One or more actuating mechanisms are provided in the brake drum assembly for selectively moving the brake shoes outwardly apart from one another into frictional engagement with the inner braking surface of the brake drum. Usually, a hydraulic or pneumatic service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the inner braking surface of the brake drum. A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the inner braking surface of the brake drum.

As mentioned above, the actuating lever of the parking and emergency brake mechanism is pivotably supported on one of the brake shoes. Two well known structures have been used in prior art brake assemblies to accomplish this. In the first prior art structure, a pivot pin assembly is provided which includes a pivot pin having an enlarged head and a reduced diameter body. The body of the pivot pin is inserted through respective aligned apertures formed through the actuating lever and a web portion of the brake shoe. An E-clip or similar fastener is then installed in a groove formed about the end of the body of the pivot pin to retain it in the apertures such that the actuating lever is pivotably supported on the brake shoe. In the second prior art structure, the actuating lever is formed having an bent tang at one end which is loosely received within an enlarged opening formed through a web portion of the brake shoe. As a result, the actuating lever is pivotably supported on the brake shoe. Although both of these prior art structures have functioned satisfactorily, they have been found to have certain drawbacks. The first prior art structure provides a secure support for the actuating lever on the brake shoe without any undesirable looseness or play therebetween, but requires the use and installation of several small and separate parts. This extra structure and installation time adds cost and complexity to the brake assembly. The second prior art structure requires no additional parts or significant installation time, but does result in a significant amount of undesirable looseness or play between the actuating lever and the brake shoe. Thus, it would be desirable to provide an improved structure for a parking and emergency brake actuating lever which provides a secure support for the actuating lever on the brake shoe without any undesirable looseness or play therebetween, and which requires no additional parts or significant installation time.

SUMMARY OF THE INVENTION

This invention relates to an improved structure for an actuating lever for a parking and emergency brake mechanism for use in a vehicle drum brake assembly. The drum brake assembly includes a backing plate mounted on the vehicle for supporting a pair of brake shoes. A service brake mechanism is provided for selectively moving the brake shoes apart from one another into frictional engagement with an inner friction surface of a brake drum mounted on a wheel of the vehicle. The brake shoes include respective web portions which are generally flat and crescent-shaped. Arcuate table portions are secured to the opposed outer curved surfaces of the web portions, such as by welding, and friction pads are secured to the outer arcuate surfaces of the table portions of the brake pads. An aperture is formed through the upper end of the web portion of one of the brake shoes. An actuating lever for a parking and emergency brake mechanism is pivotally supported on the one brake shoe. The actuating lever includes a generally flat and arcuate body portion having a stiffening rib formed along a portion thereof. A hollow cylindrical boss is formed integrally with the upper end of the body portion, extending upwardly from one side thereof. The upstanding integral boss of the actuating lever extends through the aperture formed through the upper web portion of the brake shoe. As a result, the actuating lever is retained on the brake shoe for pivoting movement relative thereto about the boss without any undesirable looseness or play therebetween, and without the use of additional parts or significant installation time.

Various objects and advantages of this invention will become apparent to those skilled in the art from the following detailed description of the preferred embodiments, when read in light of the accompanying drawings.

BRIEF DESCRIPTION OF THE DRAWINGS

FIG. 4 is a sectional elevational view of a portion of the drum brake assembly illustrated in FIG. 1 taken along line 4—4.

FIG. 5 is a sectional elevational view similar to FIG. 4 of a first alternative embodiment of this invention.

FIG. 6 is a sectional elevational view similar to FIG. 4 of a second alternative embodiment of this invention.

FIG. 7 is a sectional elevational view similar to FIG. 4 of a third alternative embodiment of this invention.

FIG. 8 is a sectional elevational view similar to FIG. 4 of a portion of a first prior art embodiment of a parking and emergency brake mechanism including an actuating lever.

FIG. 9 is a sectional elevational view similar to FIG. 4 of a portion of a second prior art embodiment of a parking and emergency brake mechanism including an actuating lever.

DETAILED DESCRIPTION OF THE PREFERRED EMBODIMENTS

Figure 1:
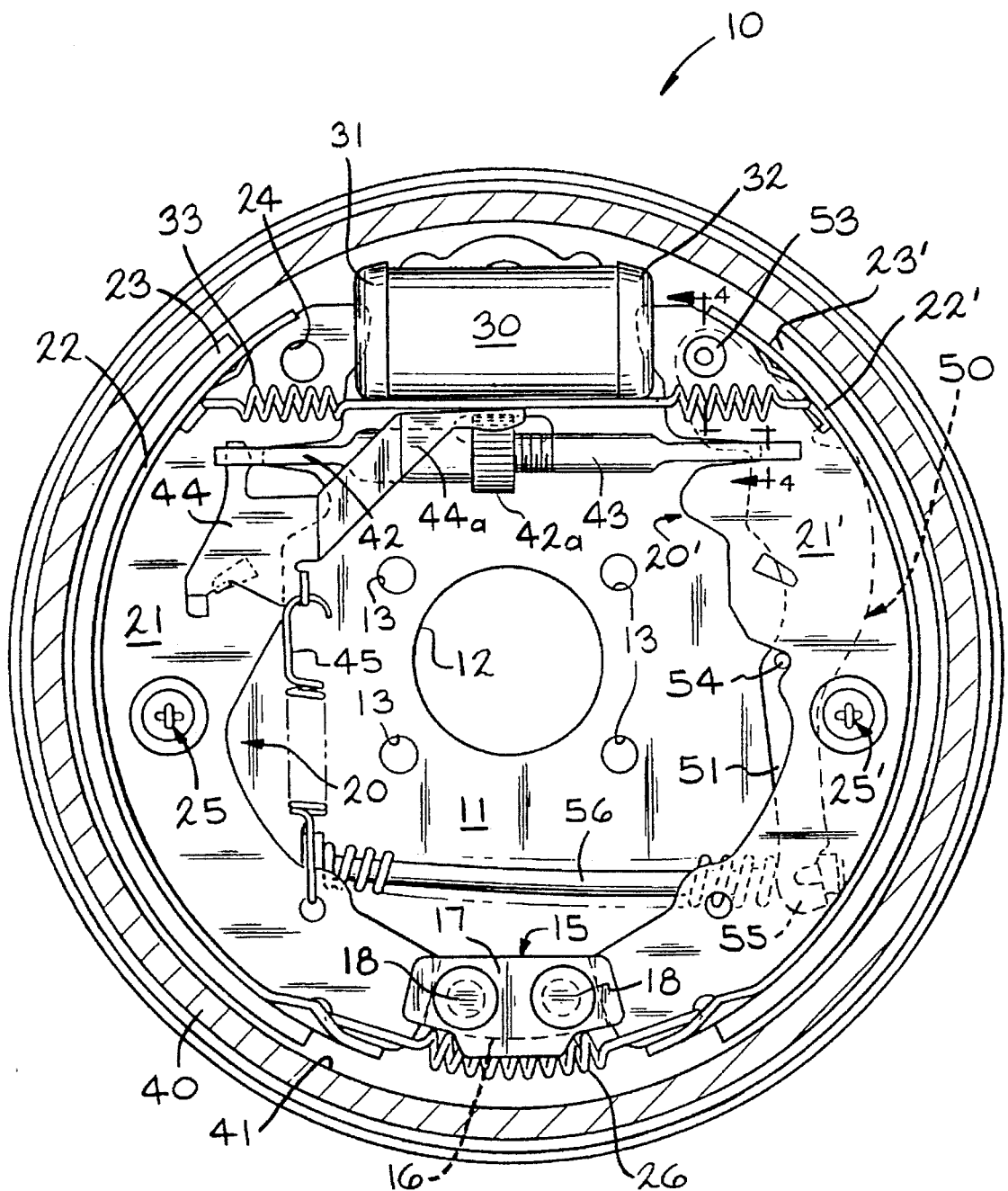
FIG. 1 is a side elevational view of a portion of a drum brake assembly including a parking and emergency brake lever in accordance with this invention.

Referring now to the drawings, there is illustrated in FIG. 1 a portion of a drum brake assembly, indicated generally at 10, in accordance with this invention. The general structure and operation of the drum brake assembly 10 is conventional in the art. Thus, only those portions of the drum brake assembly 10 which are necessary for a full understanding of this invention will be explained and illustrated in detail. Although this invention will be described and illustrated in conjunction with the particular vehicle drum brake assembly disclosed herein, it will be appreciated that this invention may be used in conjunction with other drum and disc brake assemblies.

The illustrated drum brake assembly 10 includes a rigid backing plate 11 which is generally flat and circular in shape. The backing plate 11 is adapted to secured to a fixed, non-rotatable component of the vehicle, such as an outer end of a housing (not shown) for enclosing a rotatable axle. To accomplish this, a relatively large opening 12 is formed through the central portion of the backing plate 11. The central opening 12 is provided to permit the outer end of the rotatable axle to extend therethrough to the driven vehicle wheel (not shown). A plurality of relative small holes 13 are also formed through the backing plate 12, located about the central opening 12. The small holes 13 are provided to permit threaded bolts (not shown) to extend therethrough to secure the backing plate 12 to the outer end of the axle housing.

An abutment block assembly, indicated generally at 15, is provided on the outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The drum brake assembly 10 includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'. A circular aperture 24 is formed through the upper end of the web portion 21 of the brake shoe 20 and through the upper end of the web portion 21' of the brake shoe 20' for a purpose which will be explained below.

The first and second brake shoes 20 and 20' are supported on the backing plate 11 by respective pivot pin and spring assemblies, indicated generally at 25 and 25', which are conventional in the art. As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings formed through the lower ends of the web portions 21 and 21' so as to urge such lower ends thereof into abutment with the opposed side surfaces of the spacer plate 16.

The drum brake assembly 10 further includes a hydraulic actuator 30 which is secured to the backing plate 12 between the upper ends of the web portions 21 and 21' of the brake shoes 20 and 20', respectively. The hydraulic actuator 30 includes a pair of opposed pistons 31 and 32 which respectively abut the upper ends of the web portions 21 and 21'. A second coiled spring 33 has hooked ends which extend through respective openings formed through the upper ends of the web portions 21 and 21' so as to urge such upper ends thereof into abutment with the pistons 31 and 32. The hydraulic actuator 30 is connected to a conventional source of pressurized hydraulic fluid (not shown) for operating the drum brake assembly 10.

The brake drum assembly 10 further includes a hollow cylindrical brake drum 40 which is secured to a wheel (not shown) of the vehicle for rotation therewith. The interior of the brake drum defines an inner cylindrical braking surface 41. When installed, the brake drum 40 is disposed adjacent to the backing plate 11 such that the brake shoes 20 and 20' extend within the inner cylindrical braking surface 41. To effect braking action, the brake shoes 20 and 20' are moved outwardly apart from one another so as to frictionally engage the inner cylindrical braking surface 41 of the brake drum 40. Such frictional engagement causes retarding or stopping of the rotational movement of the brake drum 40 and, therefore, the wheel of the vehicle in a controlled manner.

The hydraulic actuator 30 is used to operate the brake drum assembly 10 under normal service conditions. When it is desired to actuate the drum brake assembly 10, pressurized hydraulic fluid is supplied to the hydraulic actuator 30. Typically, this is accomplished by the operator of the vehicle depressing the brake pedal in the driver compartment of the vehicle. When such pressurized hydraulic fluid is supplied to the hydraulic actuator 30, the pistons 31 and 32 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the inner cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the first and second coiled springs 26 and 33 are expanded. Thus, when the pressurized hydraulic fluid to the hydraulic actuator 30 is subsequently released, the springs 26 and 33 retract the brake shoes 20 and 20' inwardly toward one another and out of frictional engagement with the inner cylindrical braking surface 41 of the brake drum 40.

The drum brake assembly 10 can include an automatic adjusting mechanism to compensate for thinning of the friction pads 23 and 23' resulting from wear caused by repeated use. The illustrated automatic adjusting mechanism is conventional in the art and includes a pair of mutually threaded struts 42 and 43 having opposed slotted ends. The upper ends of the web portions 21 and 21' of the brake shoes 20 and 20', respectively, are received within the slotted ends of the struts 42 and 43. A star wheel portion 42a is formed integrally on the strut 42. An adjuster lever 44 is pivotably mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portions 21 so as to urge the protruding arm portion 44a of the adjuster lever 44 into engagement with the star wheel portion 42a of the strut 42.

As is known, when the brake shoes 20 and 20' are moved outwardly apart from one another to frictionally engage the inner cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a and the strut 42 relative to the strut 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the inner cylindrical braking surface 41 of the brake drum 40 as wear occurs during operation of the drum brake assembly 10. The construction of the drum brake assembly 10 thus far described is conventional in the art.

Figure 2:
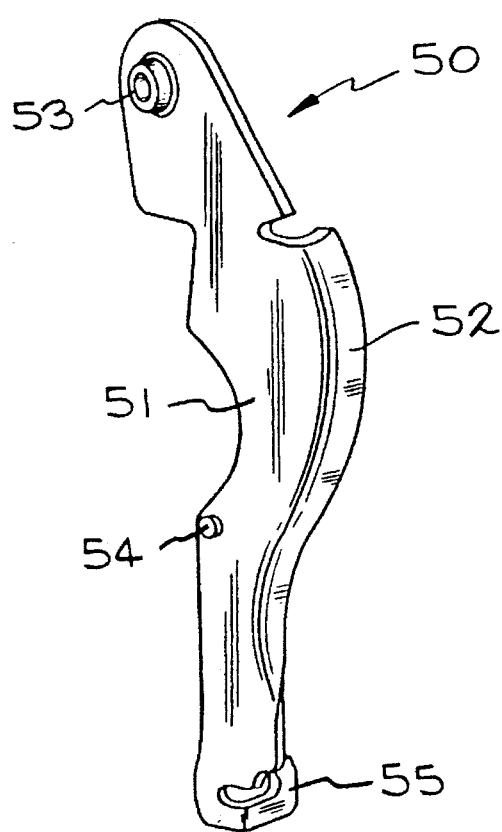
FIG. 2 is a rear perspective view of the parking and emergency brake lever shown in FIG. 1.
Figure 3:
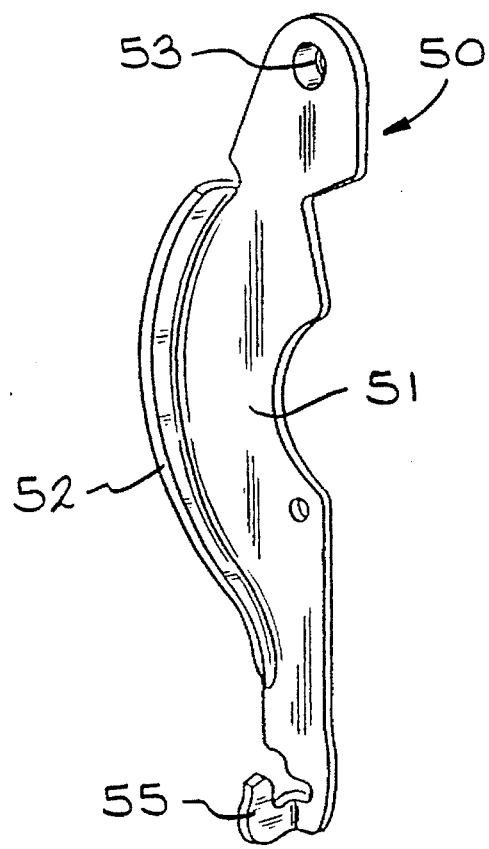
FIG. 3 is a front perspective view of the parking and emergency brake lever shown in FIG. 1.

In addition to the hydraulic actuated service brake mechanism described above, the drum brake assembly 10 of this invention further includes a mechanically actuated parking and emergency brake mechanism. The parking and emergency brake mechanism includes an actuating lever, indicated generally at 50. The structure of the actuating lever 50 is more clearly illustrated in FIGS. 2, 3, and 4. As shown therein, the actuating lever 50 includes a generally flat and arcuate body portion 51 having a stiffening rib 52 formed along a portion thereof. A hollow cylindrical boss 53 is formed integrally with the upper end of the body portion 51, extending from one side thereof. Also, an upstanding pin 54 is formed integrally with the body portion 51 on the same side as the boss 53. A hooked end portion 55 is formed on the lower end of the body portion 51.

Referring back to FIG. 1, it can be seen that the upstanding integral boss 53 of the actuating lever 50 extends through the aperture 24 formed through the upper web portion 21' of the brake shoe 20'. The outer diameter of the boss 53 is slightly smaller than the inner diameter of the aperture 24. Thus, the boss 53 is snugly received within the aperture 24 without substantial looseness or play therebetween. However, the actuating lever 50 is free to pivot relative to the brake shoe 20'. The upper body portion 51 of the actuating lever 50 extends through the slotted end of the strut 43 with the upper web portion 21' of the brake shoe 20'. Thus, the actuating lever 50 is retained on the brake shoe 20 for pivoting movement relative thereto about the boss 53. As discussed above, the second coiled spring 33 pulls the upper end of the web portion 21' toward the slotted end of the strut 43. Because the upstanding boss 53 extends through the aperture 24 formed through the upper end of such web portion 21', the upper end of the actuating lever 50 is also urged toward the slotted end of the strut 43. As a result, the lower end of the actuating lever 50 is pivoted about slotted end of the strut 43. The upstanding pin 54 is thus urged into abutment with the inner edge of the web portion 21' of the brake shoe 20' to limit this pivoting movement.

As mentioned above, a hooked end portion 55 is formed on the lower end of the body portion 51. The hooked end portion 55 is provided to facilitate the connection of one end of an actuating cable 56 thereto. The actuating cable 56 is conventional in the art and is connected to a hand operated lever or similar manually operable parking and emergency brake mechanism for manually selectively the drum brake assembly 10. When this occurs, the actuating cable 56 is pulled toward the left when viewing FIG. 1. This causes the lower end of the actuating lever 50 to pivot about the fulcrum provided by the slotted end of the strut 43, resulting in clockwise movement of the upper end of the actuating lever 50 as well. As a result, the upper ends of the web portions 21 and 21' of the brake shoes 20 and 20', respectively, are moved apart from one another into frictional engagement with the inner braking surface 41 of the brake drum 40.

FIG. 5 illustrates a first alternate embodiment of this invention. In this embodiment, a boss 57 is formed on the web portion 21' of the brake shoe 20', as opposed to the boss 53 described above. Similarly, an aperture 58 is formed through the body portion 51 of the actuating lever 50, as opposed to the aperture 24 described above. The boss 57 formed on the web portion 21' of the brake shoe 20' extends through the aperture 58 formed through the body portion 51 of the actuating lever 50. The outer diameter of the boss 57 is slightly smaller than the inner diameter of the aperture 58. Thus, the boss 57 is snugly received within the aperture 58 without substantial looseness or play therebetween. However, the actuating lever 50 is free to pivot relative to the brake shoe 20', as described above.

FIG. 6 illustrates a second alternative embodiment of this invention. In this embodiment, a modified boss 53' is formed on the body portion 51 of the actuating lever 50. The modified boss 53' is not hollow and cylindrical in shape, as the boss 24 described above, but rather is a closed deformation having an outer cylindrical shape. The modified boss 53' extends through the aperture 24 formed through the web portion 21' of the brake shoe 20'. The outer diameter of the modified boss 53' is slightly smaller than the inner diameter of the aperture 24. Thus, the modified boss 53' is snugly received within the aperture 24 without substantial looseness or play therebetween. However, the actuating lever 50 is free to pivot relative to the brake shoe 20', as described above.

FIG. 7 illustrates a third alternative embodiment of this invention. In this embodiment, a recess 24' is formed in the web portion 21' of the brake shoe 20', as opposed to the aperture 24 described above. The boss 53 is hollow and cylindrical in shape and extends into the recess 24' formed in the web portion 21' of the brake shoe 20'. The outer diameter of the boss 53 is slightly smaller than the inner diameter of the recess 24'. Thus, the boss 53 is snugly received within the recess 24' without substantial looseness or play therebetween. However, the actuating lever 50 is free to pivot relative to the brake shoe 20', as described above.

FIG. 8 illustrates a first prior art embodiment of a portion of a parking and emergency brake mechanism including an actuating lever, indicated generally at 60. The first prior art actuating lever 60 includes a generally flat and arcuate body portion 61 having a stiffening rib (not shown) formed along a portion thereof. No hollow cylindrical boss is formed integrally with the upper end of the body portion 61. Rather, an aperture 62 is formed through the upper end of the body portion 61, and a pivot pin 63 extends through the aperture 62 and the aperture 24 formed through the upper end of the web portion 21' of the brake shoe 20'. A retaining clip 64 is provided to retain the pivot pin 63 on the web portion 21' of the brake shoe 20'. Although not illustrated, the prior art actuating lever 60 also includes an upstanding pin and a lower hooked end portion which are similar to the pin 54 and the lower hooked end portion 55 discussed above.

FIG. 9 illustrates a second prior art embodiment of a portion of a parking and emergency brake mechanism including an actuating lever, indicated generally at 70. The second prior art actuating lever 70 includes a generally flat and arcuate body portion 71 having a stiffening rib (not shown) formed along a portion thereof. No hollow cylindrical boss is formed integrally with the upper end of the body portion 71. Rather, an upper hooked end portion 72 is provided on the upper end of the body portion 71. The upper hooked end portion 72 extends through the aperture 24 formed through the upper end of the web portion 21' of the brake shoe 20'. As shown in FIG. 9, there is a substantial amount of looseness or play between the actuating lever 70 and the brake shoe 20' in the second prior art embodiment. Although not illustrated, the second prior art actuating lever 70 also includes an upstanding pin and a lower hooked end portion which are similar to the pin 54 and the lower hooked end portion 55 discussed above.

Although the invention has been described and illustrated in the context of a leading/trailing type of drum brake assembly 10, it will be appreciated that this invention may be used in other types of brake assemblies. For example, this invention may be used in a "duo-servo" type of drum brake assembly, or in a "dual mode" drum brake assembly wherein the service brake is of the leading/trailing type and the parking and emergency brake is of the duo-servo type.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A brake assembly comprising:

a backing plate;

a brake member;

first and second brake shoes supported on said backing plate for selective movement into frictional engagement with said brake member;

an actuating lever for selectively moving said brake shoes into frictional engagement with said brake member;

a generally cylindrical boss of generally uniform diameter formed integrally as one-piece with one of said first brake shoe and said actuating lever; and an aperture formed through the other of said first brake shoe and said actuating lever, said boss extending into and journalled within said aperture for supporting said actuating lever on said first brake shoe for pivoting movement.

2. The brake assembly defined in claim 1 wherein said boss is formed integrally as one-piece with said actuating lever and said aperture is formed through said first brake shoe.

3. The brake assembly defined in claim 1 wherein said boss is formed integrally as one-piece with said first brake shoe and said aperture is formed through said actuating lever.

4. The brake assembly defined in claim 1 wherein said aperture is generally circular in shape.

5. The brake assembly defined in claim 4 wherein said boss defines an outer diameter which is slightly smaller than an inner diameter defined by said aperture.

6. The brake assembly defined in claim 4 wherein said boss is hollow.

7. The brake assembly defined in claim 4 wherein said boss is a closed deformation.

8. A brake assembly comprising:

a backing plate;

a brake member;

first and second brake shoes supported on said backing plate for selective movement into frictional engagement with said brake member;

an actuating lever for selectively moving said brake shoes into frictional engagement with said brake member;

a generally cylindrical boss of generally uniform diameter formed integrally as one-piece with one of said first brake shoe and said actuating lever; and a recess formed in a surface of the other of said first brake shoe and said actuating lever, said boss extending into and journalled within said recess for supporting said actuating lever on said first brake shoe for pivoting movement.

9. A drum brake assembly comprising:

a backing plate;

a brake drum;

first and second brake shoes supported on said backing plate and movable into frictional engagement with said brake drum, each of said first and second brake shoes including a web portion, a table portion secured to said web portion, and a friction pad secured to said table portion;

a service brake mechanism for selectively moving said brake shoes into frictional engagement with said brake drum;

a parking and emergency brake mechanism for selectively moving said brake shoes into frictional engagement with said brake drum, said parking and emergency brake mechanism including an actuating lever;

a generally cylindrical boss of generally uniform diameter formed integrally as one-piece with one of said first brake shoe and said actuating lever; and an aperture formed through the other of said first brake shoe and said actuating lever, said boss extending into and journalled within said aperture for supporting said actuating lever on said first brake shoe for pivoting movement.

10. The drum brake assembly defined in claim 8 wherein said aperture is generally circular in shape.

11. The drum brake assembly defined in claim 10 wherein said boss defines an outer diameter which is slightly smaller than an inner diameter defined by said aperture.

12. The drum brake assembly defined in claim 10 wherein said boss is hollow.

13. The drum brake assembly defined in claim 10 wherein said boss is a closed deformation.

14. The drum brake assembly defined in claim 9 wherein said boss is formed integrally as one-piece with said actuating lever and said aperture is formed through said first brake shoe.

15. The drum brake assembly defined in claim 9 further including a rotation preventing abutment secured relative to said backing plate and disposed between and engageable with said brake shoes.

16. The drum brake assembly defined in claim 9 and further including a projection provided on said actuating lever.

17. The drum brake assembly defined in claim 16 wherein said boss and said projection are located on the same side surface of said actuating lever.

18. The drum brake assembly defined in claim 9 wherein said actuating lever includes a reversely bent back lower end for receiving an end of an actuation cable.

19. The drum brake assembly defined in claim 9 wherein said service brake mechanism is hydraulically actuated.

20. The drum brake assembly defined in claim 9 further including an automatic brake adjusting mechanism operatively connected to said actuating lever and said first and second brake shoes.

21. The drum brake assembly defined in claim 9 wherein the drum brake assembly is a leading/trailing drum brake assembly.

* * * * *

UNITED STATES PATENT AND TRADEMARK OFFICE
CERTIFICATE OF CORRECTION

PATENT NO. : 5,538,112
DATED : July 23, 1996
INVENTOR(S) : Larry L. Last

It is certified that error appears in the above-indentified patent and that said Letters Patent is hereby corrected as shown below:

Column 8, Claim 10, Line 1, after "claim", change "8" to -- 9 --.

Signed and Sealed this

Twelfth Day of November, 1996

Attest:

BRUCE LEHMAN

*Attesting Officer*     *Commissioner of Patents and Trademarks*